United States Patent [19]

Raley et al.

[11] Patent Number: 4,644,623

[45] Date of Patent: Feb. 24, 1987

[54] METHOD OF MAKING A ROTATABLE MOLDING ELEMENT FOR SELECTIVELY APERTURING THERMOPLASTIC FILM

[75] Inventors: Garland E. Raley; Dean M. Spear, both of Terre Haute, Ind.

[73] Assignee: Ethyl Corporation, Richmond, Va.

[21] Appl. No.: 721,883

[22] Filed: Apr. 11, 1985

Related U.S. Application Data

[62] Division of Ser. No. 499,857, Jun. 1, 1983, Pat. No. 4,541,794.

[51] Int. Cl.⁴ .................... B21H 1/18; B32B 31/04
[52] U.S. Cl. ....................... 29/148.4 D; 29/121.3; 156/215; 425/290; 425/291
[58] Field of Search ............... 156/215, 209, 500, 285; 425/290, 291; 29/121.1, 121.3, 148.4 D; 206/389; 264/504

[56] References Cited

U.S. PATENT DOCUMENTS

| | | | |
|---|---|---|---|
| 3,811,983 | 5/1974 | Rowland | 156/500 |
| 4,252,561 | 2/1981 | Raley et al. | 425/290 |
| 4,395,215 | 7/1983 | Bishop | 425/290 |

Primary Examiner—Michael Wityshyn
Assistant Examiner—J. Davis
Attorney, Agent, or Firm—Donald L. Johnson; John F. Siebeth; Paul H. Leonard

[57] ABSTRACT

An apparatus for the manufacture of selectively apertured thermoplastic sheet or film, comprising a rotatable molding element means for receiving the film and which means has a predetermined pattern therein wherein as the film is contacted with the rotatable molding element means and a fluid pressure differential is applied to the surface of the film, a desired pattern of perforated areas and non-perforated areas are imparted to the film with each of said areas being continuous across the web of the film and alternating in the machine direction.

8 Claims, 10 Drawing Figures

METHOD OF MAKING A ROTATABLE MOLDING ELEMENT FOR SELECTIVELY APERTURING THERMOPLASTIC FILM

This application is a division of application Ser. No. 499,857, filed June 1, 1983, now U.S. Pat. No. 4,541,794.

BACKGROUND OF THE INVENTION

The present invention relates to thermoplastic sheet and film products. More particularly, the invention relates to an apparatus for producing selectively apertured thermoplastic sheet or film.

Perforated and embossed thermoplastic sheet or film have many useful applications. Perforated film is used in gardening and farming to prevent the growth of grass and other weeds while permitting more moisture to be transmitted through the film to the soil beneath. Perforated film is also used for making disposable baby diapers. U.S. Pat. No. 3,814,101 discloses diapers employing perforated thermoplastic film which permits the flow of liquid in the direction of the absorbent material in the diaper but substantially reduces the possibility of flow in the opposite direction. Embossed film without perforations are also used in making baby diapers, and in other applications where it is important that the film have a clothlike appearance or feel.

One of the methods for perforating thermoplastic sheet or film is disclosed in U.S. Pat. No. 3,054,148, issued to Zimmerli, which is hereby incorporated by reference. The Zimmerli patent discloses a stationary drum having a molding element mounted around the outer surface of the drum and being adapted to rotate freely thereon. A vacuum chamber is employed beneath the screen or molding element to create a pressure differential between the respective surfaces of the thermoplastic sheet to cause the plasticized sheet to flow into the perforations provided in the molding element and thereby cause a series of holes to be formed in the sheet.

More recently, various apparati have been constructed to produce a variety of types of perforated plastic film. These are illustrated by U.S. Pat. No. 4,155,693 and U.S. Pat. No. 4,157,237, issued to Raley, and U.S. Pat. No. 4,252,516 issued to Raley and Adams. Although all of these devices are effective for their intended purposes, they have limited capability for producing selectively apertured or perforated film.

In general, to successfully aperture or perforate a film on vacuum process equipment, a minimum vacuum level and a minimum melt temperature must be maintained. In order to prevent operating in a selected area one or both of these conditions must be lowered in that area but only to the extent that holes or perforations are not formed and the pattern retained.

Previously, it has been possible to manufacture an apertured/non-apertured thermoplastic film only with the apertured area and non-apertured area alternating across the web of the film and running continuously in the machine direction. Production of a film of this type requires modification of the stationary seals within the vacuum roll or drum. The modification is accomplished by cutting back the seals to provide a controlled vacuum leak. The latter produces the non-perforated area during production of the film.

Since the screen or molding element rotates with the web it is desirable to produce a screen which will produce a selectively apertured film of any desired configuration.

Elimination of the seal cut back requirement facilitates changing from one type of product to another.

OBJECTS OF THE INVENTION

Accordingly, it is a principal object of the invention to provide an apparatus which will produce a thermoplastic film having apertured areas and non-apertured areas which are continuous across the web of the film and which alternate in the machine direction.

An important object of the instant invention is to provide an apparatus for producing selectively apertured film of any desired configuration.

A main object of the present invention is to provide a rotatable molding element or screen which is so constructed that localized restriction of airflow through the screen is provided which produces a reduction of the vacuum effect thereby enabling a thermoplastic film to be produced which is continuously patterned and selectively apertured in any desired repetitive form.

Another object of the instant invention is to provide a method for producing selectively apertured film of any desired configuration.

Other objects and advantages of the invention will become more readily apparent from a reading of the drawings and description hereinafter.

SUMMARY OF THE INVENTION

An apparatus is provided for the manufacture of selectively, apertured thermoplastic film or sheet which comprises: a rotatable molding element means or screen for receiving the thermoplastic film and for imparting a desired pattern of perforated areas and non-apertured areas on the film upon contact therewith and the application of a fluid pressure differential to the surface of the film, each of said areas being continuous across the web of the film or sheet and alternating in the machine direction.

A method is also provided for making a selectively apertured thermoplastic film in which apertured and non-apertured areas of the film are continuous across the web of the film and alternate in the machine direction.

DESCRIPTION OF THE PERFORATED EMBODIMENTS

Figure 1:
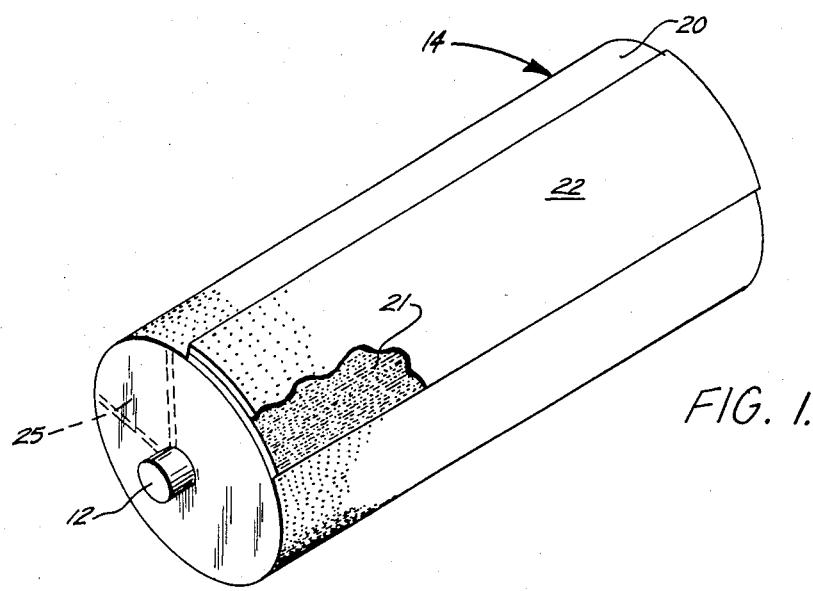
FIG. 1 is a perspective view of a perforating drum with a screen positioned thereon.
Figure 2:
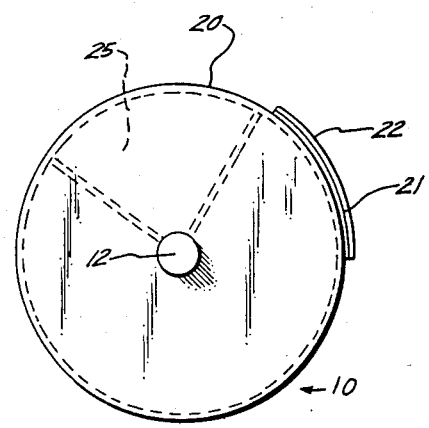
FIG. 2 is an end view of the drum of FIG. 1.

Referring now to FIGS. 1 and 2 of the drawings, a stationary cylindrical roll or drum 10 is shown disposed about an axle 12. The outer cylindrical surface of the drum is preferably formed of highly polished metal but may be made of any other material having a relatively low coefficient of friction. A rotatable molding element or screen of the invention is generally indicated by the numeral 14 and is shown in FIGS. 1 and 2 to be placed about the drum 10. Axle 12 defines the axis about which the molding element 14 rotates.

The screen 14 is mounted around the surface of the drum 10 and is adapted to be rotated freely thereon. The screen may be formed as an integral unit in the shape of a cylinder and adapted to be slipped on the drum 10 from an end thereof or it may be wrapped around the drum 10 and then secured in any suitable manner. For the purpose of rotating the screen 14, a gear drive may be employed which is adapted to mesh with gearing provided on the screen itself, or a pully drive may be connected to the molding element or screen by means of caps provided on the ends thereof. If desired, the screen could be rigidly attached to the drum 10 and the entire drum could be rotated, thereby rotating the screen 14. In effect, the screen 14 may be rotated about the drum in any desired manner by any suitable means.

The screen 14 is composed of a cylindrical base pattern screen 20, an air flow restrictor sheet material 21, and an overlayed pattern screen 22.

The base screen 20 is preferably made of metal or other suitable material of high heat conductivity to effect a reduction in the relative temperature of those portions of plasticized material which come in contact with the solid surface of the screen as distinguished from those portions of the plastic material which are directly over the perforations or voids in the screen. The screen can be made of a variety of materials and, depending on the effect desired, the perforations may be of many shapes and designs. The molding element may be made from a metal sheet or cylinder having the perforated design stamped or otherwise formed, normally by etching or plating techniques, or can be made of a woven wire mesh. The screen 20 provides the apertured or perforated area of the plastic sheet or film.

The thin air flow restrictor sheet material 21, such as spunbonded-nonwoven remay polyester cloth is mounted over the outer surface of a portion of the cylindrical screen in a localized area from which a non-apertured or non-perforated film is desired. The restrictor material 21 is adhered to the screen with a spray adhesive or suitable equivalent. An overlay screen of any desired or predetermined pattern is cut to substantially the same size and shape as the overlayed restrictor material 21 and is soldered or otherwise secured in place around its entire perimeter. Testing has indicated that as much as two 5 mil layers of the remay material are required to completely eliminate formation of holes in the non-apertured areas. Other material, such as fine mesh, thin screens or the like are acceptable as restrictor material. The completed screen or molding element 14 when operated on standard vacuum equipment, with standard seals, produces a non-apertured film where the overlay has been applied and apertured film in all of the other areas. It can readily be appreciated that the application of the overlay provides an unlimited variety of configurations. The variety of selectively apertured film which can be produced on such a screen is basically unlimited.

Also in FIGS. 1 and 2, the vacuum chamber is schematically represented by the area 25 between the dotted lines at the end of the drum 10 and the surface of the drum 10. The vacuum chamber 25 may be any conventional vacuum chamber well known in the art. The vacuum chamber 25 is similar to that disclosed in the aforementioned Zimmerli patent although in the particular embodiment shown in the present invention, the drum 10 rotates about the axle 12 and the molding element or screen 14 rotates therewith. The area defined by the vacuum chamber 25 remains stationary within the drum.

Figure 3:
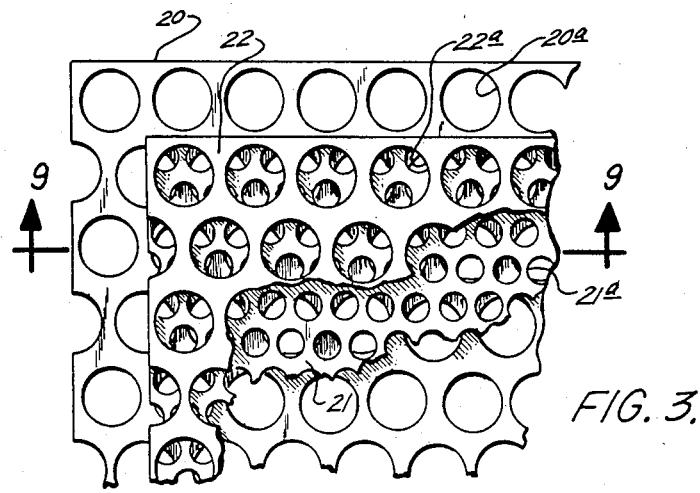
FIG. 3 is a cut-away, enlarged view of a portion of the screen of FIGS. 1 and 2.
Figure 9:
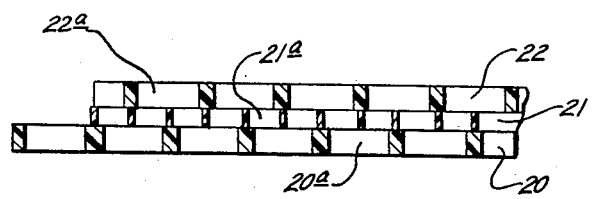
FIG. 9 is a sectional view taken along line 9—9 of FIG. 3.

Referring now to FIG. 3, an enlarged portion of a screen 14 is illustrated. The base screen 20 has a plurality of holes 20a therein. The restrictor material 21 has a plurality of much smaller openings 21a therein. The overlay screen 22 has a plurality of openings 22a therein which are designed to impart a particular shaped perforation or aperture in the plastic film. The multilayer screen 14 is also illustrated in FIG. 9 and each of the screens 20, 21 and 22 with their respective openings 20a, 21a and 22a can be readily seen.

Figure 4:
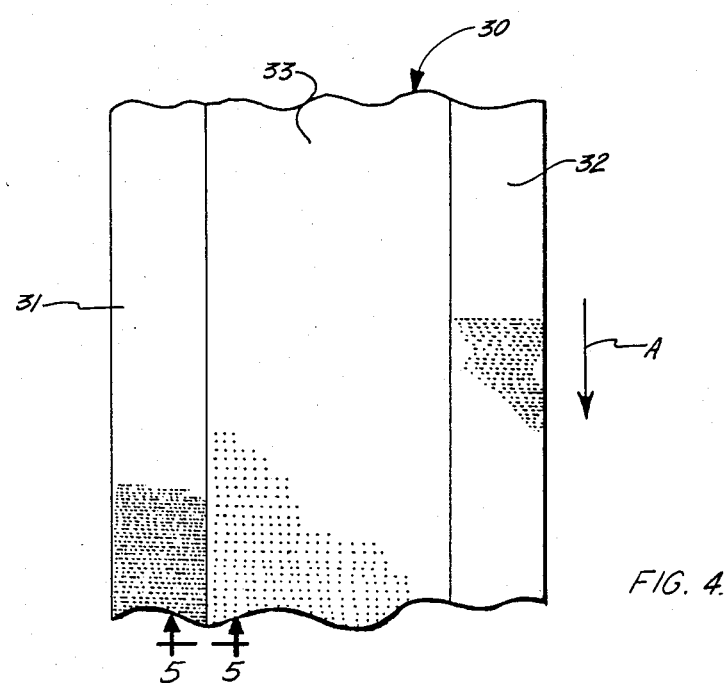
FIG. 4 is a top plan view of a section of plastic film having apertured and non-apertured areas alternating across the web of the film and running continuously in the machine direction.

It can be appreciated that other arrangements of restrictor material or screen 21 and overlay screen 22 may be made around the base screen 20 to produce a particular patterned or selectively apertured plastic sheet or film. Referring to FIG. 4, a plastic sheet or film 30 is shown which has non-apertured areas 31 and 32 on each side thereof and an apertured portion 33 in the center thereof between the non-apertured areas. The machine direction of the film 30 is indicated at A.

Figure 5:
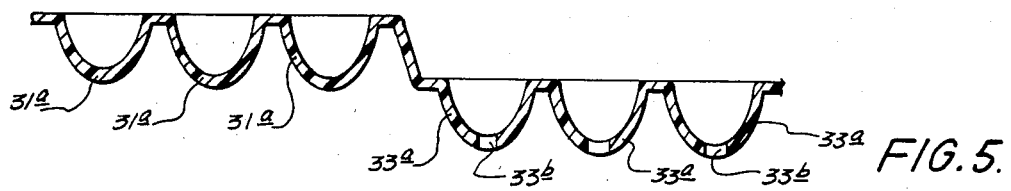
FIG. 5 is an enlarged sectional view of the plastic film taken along line 5—5 of FIG. 4.

In FIG. 5, a portion of the film 30 is illustrated showing non-apertured depressions 31a and apertured depressions 33a with openings or perforations 33b therein. It can be appreciated that this is only one illustration of a type of embossment or depression that can be imparted to a plastic film.

Figure 6:
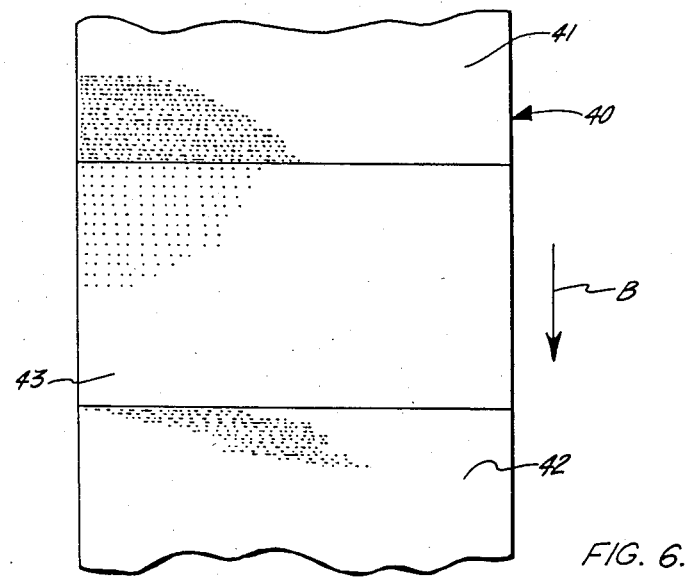
FIG. 6 is a view similar to that of FIG. 4 with the plastic film having apertured and non-apertured areas alternating in the machine direction.

In FIG. 6, a plastic film 40 is shown which can be prepared on a screen of the present invention wherein the machine direction is as indicated in B. The plastic film 40 has non-perforated areas 41 and 42 and a perforated area 43. The embossings or depressions are similar to those illustrated in FIG. 5, but can be of a variety of constructions as desired.

Figure 7:
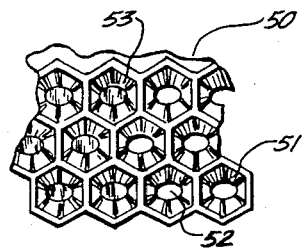
FIG. 7 is an enlarged view of a small portion of the plastic film of FIG. 4.

Referring now to FIG. 7 a portion of a plastic film 50 is illustrated which has a series of generally hexagonally-shaped depressions 51 attached at their edges. The hexagonal depressions have elliptical-shaped holes 52 centered therein. Another portion of the film 50 has similarly shaped hexagonal depressions 53, but these do not have the holes 52 therein. This film is only one type which can be manufactured on the screen of the present invention.

Figure 8:
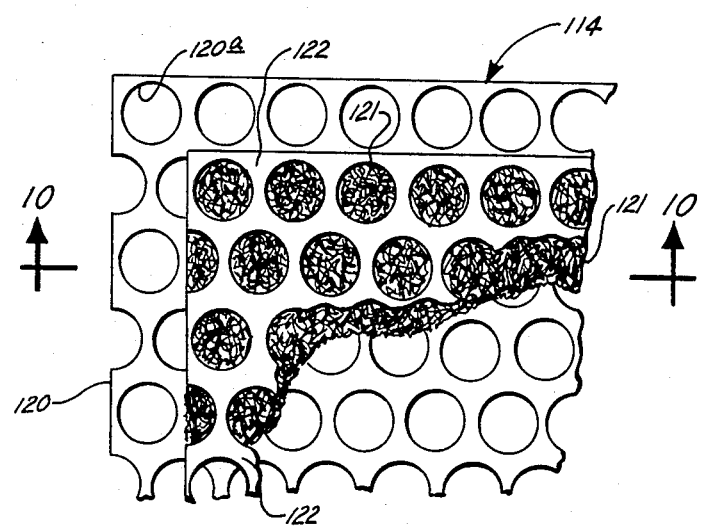
FIG. 8 is a cut-away enlarged view of a portion of an alternate screen construction.
Figure 10:
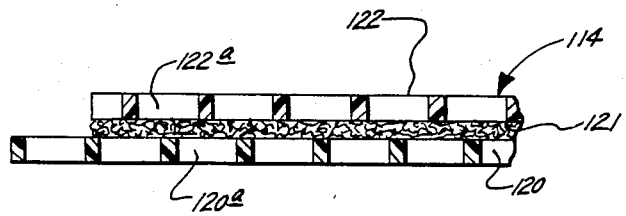
FIG. 10 is a sectional view taken along line 10—10 of FIG. 8.

FIG. 8, which is illustrative of a screen 114 which has a base screen 120 having a plurality of openings 120a therein and on which is positioned a remay polyester cloth 121 and an overlay screen 122 having openings 122a therein positioned over the cloth 121. In FIG. 10, the screen 114 may be seen with its separate layers 120, 121 and 122. Openings or holes 120a and 122a may be seen in their respective screens 120 and 122.

The screen of the present invention may be used with any thermoplastic material which can be formed into flexible film or sheets. Exemplary thermoplastic materials include cellulose, e.g., cellulose acetate, cellulose propionate, cellulose butyrate; mixed esters of cellulose;

cellulose ethers, e.g., ethyl cellulose; nylon or polymeric materials, e.g. polyvinyl alcohol acetals, polyvinyl chloride, polyvinyl chloride acetate, polystyrene, methyl methacrylate, polyethylene, polypropylene, and other polyolefins which may be formed into flexible sheet or film, and the like. Polyolefins are preferred and polyethylene is especially preferred. Sheets or films made from cellulose materials may be plasticized with suitable plasticizers and other additives known in the art may be added to achieve a desired physical characteristic.

It can be appreciated that a wide variety of screens, cloth, or other material combinations which when overlayed and bonded to a base cylindrical screen will produce selectively apertured film, via a vacuum process and which film has an unlimited variety of sizes, shapes and texture qualities. Using screens of this invention films can be produced which have repetitive areas differing in pattern, porosity, texture, appearance and mechanical properties.

In addition to remay polyester cloth, other breathable thermally resistant materials can be used.

The foregoing disclosure and description of the invention is illustrative and explanatory thereof and various changes in the illustrated process may be made within the scope of the appended claims without departing from the spirit of the invention.

What is claimed:

1. A method of making a rotatable molding element means for selectively aperturing thermoplastic sheet or film comprising:
   a. providing a cylindrically shaped base pattern screen having a plurality of openings therein arranged in a predetermined pattern wherein as thermoplastic film is contacted with said screen and a fluid pressure differential is placed on the surface of the film, said pattern on said screen is imparted to the film;
   b. mounting a spunbonded-nonwoven breathable thermally resistant thin airflow restrictor sheet material over the outer surface of a portion of the base pattern screen for providing localized restriction of airflow through said screen; and
   c. mounting an overlay screen over said airflow restrictor sheet material and securing said overlay screen on said base pattern screen thereby providing a rotatable element means for perforating a thermoplastic film having a desired pattern of perforated areas and non-perforated areas.

2. The method of claim 1, wherein said airflow restrictor sheet material is a spunbonded-nonwoven polyester cloth.

3. The method of claim 1, wherein said cylindrically shaped base pattern screen is made of metal or other suitable material of sufficiently high heat conductivity to effect a reduction in the relative temperature of those portions of plasticized material to come in contact with the solid surface of the screen as distinguished from those portions of the plasticized material which are directly over the openings in said screen.

4. The method of claim 1, wherein said cylindrically shaped base pattern screen is a woven wire mesh screen.

5. The method of claim 1, wherein said overlay screen has been formed to substantially the same size and shape as the airflow restrictor sheet material.

6. The method of claim 1, wherein said airflow restrictor sheet material comprises two layers of spunbonded-nonwoven breathable thermally resistant sheet materials each having a thickness of about 5 mils.

7. A method of making a rotatable molding element means for selectively aperturing thermoplastic sheet or film comprising:
   a. providing a cylindrically shaped base pattern screen having a plurality of openings therein arranged in a predetermined pattern wherein as thermoplastic film is contacted with said screen and a fluid pressure differential is placed on the surface of the film, said pattern on said screen is imparted to the film:
   b. adhesively attaching a spunbonded-nonwoven breathable thermally resistant thin airflow restrictor sheet material over the outer surface of a portion of the base pattern screen for providing localized restriction of airflow through said screen; and,
   c. mounting an overlay screen over said airflow restrictor sheet material and securing said overlay screen on said base pattern screen thereby providing a rotatable element means for perforating a thermoplastic film having a desired pattern of perforated areas and non-perforated areas.

8. A method of making a rotatable molding element means for selectively aperturing thermoplastic sheet or film comprising:
   a. providing a cylindrically shaped base pattern screen having a plurality of openings therein arranged in a predetermined pattern wherein as thermoplastic film is contacted with said screen and a fluid pressure differential is placed on the surface of the film, said pattern on said screen is imparted to the film, and said openings formed in said cylindrically shaped base pattern screens having been formed by etching techniques; and,
   b. mounting a spunbonded-nonwoven breathable thermally resistant thin airflow restrictor sheet material over the outer surface of a portion of the base pattern screen for providing localized restriction of airflow through said screen; and
   c. mounting an overlay screen over said airflow restrictor sheet material and securing said overlay screen on said base pattern screen thereby providing a rotatable element means for perforating a thermoplastic film having a desired pattern of perforated areas and nonperforated areas.

* * * * *